United States Patent
Leed

(10) Patent No.: US 7,807,594 B2
(45) Date of Patent: Oct. 5, 2010

(54) FIRE RESISTANT GLASS FIBER

(75) Inventor: Elam A. Leed, Pine, CO (US)

(73) Assignee: Johns Manville, Denver, CO (US)

( * ) Notice: Subject to any disclaimer, the term of this patent is extended or adjusted under 35 U.S.C. 154(b) by 478 days.

(21) Appl. No.: 11/893,192

(22) Filed: Aug. 15, 2007

(65) Prior Publication Data

US 2009/0048091 A1 Feb. 19, 2009

(51) Int. Cl.
*C03C 13/06* (2006.01)

(52) U.S. Cl. .............................. 501/36; 501/35; 501/70

(58) Field of Classification Search .................. 501/35, 501/36, 70
See application file for complete search history.

(56) References Cited

U.S. PATENT DOCUMENTS

| | | | | |
|---|---|---|---|---|
| 4,867,779 | A | * | 9/1989 | Meunier et al. ................. 71/62 |
| 5,037,470 | A | * | 8/1991 | Matzen et al. .................. 71/52 |
| 5,932,500 | A | * | 8/1999 | Jensen et al. ................... 501/36 |
| 5,935,886 | A | * | 8/1999 | Jensen et al. ................... 501/36 |
| 6,156,683 | A | * | 12/2000 | Grove-Rasmussen et al. . 501/35 |
| 6,284,684 | B1 | * | 9/2001 | Vignesoult et al. ............. 501/36 |
| 6,698,245 | B1 | * | 3/2004 | Christensen et al. ........... 65/376 |
| 6,897,173 | B2 | * | 5/2005 | Bernard et al. ................. 501/36 |
| 6,998,361 | B2 | * | 2/2006 | Lewis ........................... 501/36 |
| 7,189,671 | B1 | * | 3/2007 | Lewis ........................... 501/36 |
| 2003/0166446 | A1 | * | 9/2003 | Lewis ........................... 501/27 |
| 2003/0181306 | A1 | * | 9/2003 | Bernard et al. ................. 501/36 |
| 2007/0135291 | A1 | * | 6/2007 | Bernard et al. ................. 501/36 |
| 2008/0191179 | A1 | * | 8/2008 | Bernard et al. .............. 252/601 |

FOREIGN PATENT DOCUMENTS

WO WO 2006103375 A2 * 10/2006

* cited by examiner

*Primary Examiner*—Karl E Group
*Assistant Examiner*—Elizabeth A Bolden
(74) *Attorney, Agent, or Firm*—Robert D. Touslee

(57) ABSTRACT

A glass fiber composition comprises about 33-47 weight % $SiO_2$; about 18-28 weight % $Al_2O_3$; about 5-15 weight % $Fe_2O_3$; greater than or equal to about 2 weight % and less than 10 weight % $R_2O$; about 8-30 weight % CaO; and less than 4 weight % MgO; wherein $R_2O$ represents alkali metal oxides. Preferably, the glass fiber composition has a liquidus temperature of less than 2350° F.; and a viscosity at a liquidus temperature of the glass fiber composition of greater than 500 poise; and fire resistant glass fiber formed from the glass fiber composition has a biodissolution rate of greater than 50 $ng/cm^2/hr$.

10 Claims, 1 Drawing Sheet

FIRE RESISTANT GLASS FIBER

FIELD OF ART

The present disclosure relates to high-iron glass compositions for the production of fire resistant fiber. In particular, the glass compositions have a good working range, for ease of fiberization, and the fibers formed therefrom exhibit high biodissolution rates.

BACKGROUND

Commonly manufactured glass formulations often have softening points less than 1800° F., and glass formulations used for wool fiber production often have softening points in the range of 1200-1600° F. Glasses with higher softening points can be expensive to manufacture due to the high energy input, low throughput, and specialty equipment required. High temperature applications may require exposure of wool glass products to temperatures in excess of 1800° F., which would cause the wool glass products to fail through softening.

Glass compositions formed from basalt and basalt-like rocks, melted and formed into fibers, often have relatively good working ranges for fiberization and the resulting fibers often possess good fire resistance properties through crystallization mechanisms. In particular, high temperature wool glasses can be manufactured from basaltic rocks with no additions of other components. Under high temperature conditions, basalt fiber readily crystallizes instead of softening, thereby affording sufficient high temperature resistance. The primary drawback of basalt compositions is poor biosolubility, typically biodissolution rates of less than 5 ng/cm$^2$/hr. In wool glass form, pure basalt glass fiber is not acceptable because of the potential health risk associate with the low biodissolution rate.

SUMMARY

Provided is a glass fiber composition comprising about 33-47 weight % $SiO_2$; about 18-28 weight % $Al_2O_3$; about 5-15 weight % $Fe_2O_3$; greater than or equal to about 2 weight % and less than 10 weight % $R_2O$; about 8-30 weight % CaO; and less than 4, preferably less than 2, weight % MgO; wherein $R_2O$ represents alkali metal oxides.

Also provided is a glass fiber composition consisting essentially of about 33-47 weight % $SiO_2$; about 18-28 weight % $Al_2O_3$; about 5-15 weight % $Fe_2O_3$; greater than or equal to about 2 weight % and less than 10 weight % $R_2O$; about 8-30 weight % CaO; and less than 4 weight % MgO; wherein $R_2O$ represents alkali metal oxides.

Additionally provided is a glass fiber composition having a liquidus temperature of less than 2350° F. and a viscosity at a liquidus temperature of the glass fiber composition of greater than 500 poise. Glass fiber formed from the glass fiber composition has a biodissolution rate of greater than 50 ng/cm$^2$/hr.

Among other factors, the glass fiber compositions disclosed herein exhibit good working ranges for fiberization, while fibers formed therefrom generally possess good fire resistance properties and relatively high biodissolution rates, meaning the fibers do not pose a health risk.

DETAILED DESCRIPTION

Definitions and Terms

Figure 1:
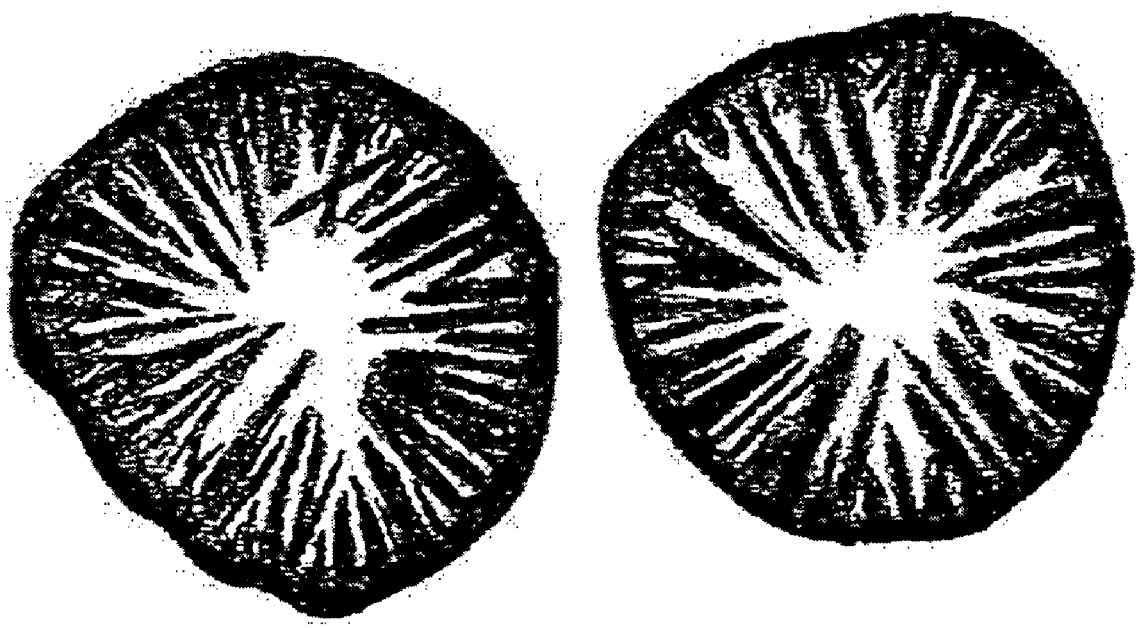
FIG. 1 shows a typical cross section of an iron-containing glass fiber as disclosed herein after exposure to fire.

The following terms will be used throughout the specification and will have the following meanings unless otherwise indicated.

Fire resistance can have varying definitions depending on the material and its application. As used herein, "fire resistance" refers to the ability of glass fiber to maintain some degree of mechanical integrity for some period of time during exposure to heat and flame, thus physically slowing the spread of fire. In some cases, fire resistance can be the same as high temperature resistance, but often high temperature resistance refers to continuous high temperature exposure in normal use. In contrast, fire resistance typically is involved only once, if ever, during the lifetime of a product.

As used herein, "flame attenuation" refers to discontinuous fiberization by the formation of continuous primary fibers, followed by the feeding of the primary fibers into a high temperature, high velocity flame in which the final attenuation occurs.

As used herein, "high temperature", in the case of the application and performance of glass fibers, refers to fire resistant applications in which the fiber is expected to maintain some limited degree of mechanical integrity during an extreme temperature condition for a limited amount of time.

As used herein, "rotary fiberization" refers to the formation of discontinuous fiber by "internal centrifuging" with a rotating disc.

It has been discovered that a solution to failure of wool glass products through softening upon exposure to high temperature is to formulate glasses that have a relatively high tendency to crystallize along with a high liquidus temperature. In the partially crystalline state, the fibers no longer obey the softening behavior dictated by the glass viscosity-temperature relationship. The crystals will remain in the solid state until the temperature exceeds the liquidus temperature, at which point the crystals will melt. Glasses can perform as high temperature fibers if, under extreme temperature conditions, they rapidly crystallize instead of softening and if the melting temperature of the resulting crystalline phases is greater than the temperature to which the fibers are exposed. Accordingly, softening point and crystallization behavior are two primary glass properties that influence the degree of fire resistance of glass fibers.

Softening Point

As used herein, "softening point controlled glass" refers to a glass whose fire resistance is controlled by the softening point of the glass. The glass fiber is unaffected at temperatures well below the softening point of the glass, but as temperature exposure approaches and exceeds the softening point of the glass, the fiber begins to soften and melt, losing its mechanical integrity and ability to resist flame. There exists a direct correlation between softening point and fire resistance for softening point controlled glasses. Softening point controlled glasses span a wide range of softening points and a correspondingly wide arrange of fire resistance. To achieve good fire resistance behavior with softening point controlled glasses, it is necessary to select compositions with much higher viscosity than typically melted in conventional fiberglass processes. For example, S-glass requires significantly higher temperatures to melt and fiberize than E-glass and requires costly low-throughput processes. For cost effective production of fire resistant fiber, especially wool fiber, it is necessary to make use of the crystallization effect for fire resistance. A good example is basalt, which exhibits improved fire resistance over softening point controlled glasses, due to crystallization when exposed to fire.

Crystallization

For some glasses with high liquidus temperatures and a strong thermodynamic driving force for crystallization, the effect of softening can be reduced or eliminated by crystallization of part of the glass fiber when exposed to flame. Basalt, which has a softening point and viscosity-temperature relationship similar to that of E-glass, has better fire resistance than softening point controlled glasses. During the initial exposure to high temperature, the basalt fiber deforms to a small degree in the deviation from round. Growth of crystals then occurs, especially in the surface layer, and it is the presence of crystals that prevents the fiber from softening further. FIG. 1 shows a typical cross section of an iron-containing glass fiber as disclosed herein after exposure to fire. Instead of softening, the fiber undergoes crystallization (represented by the dark regions of FIG. 1), while only slight deforming from round.

Balancing Crystallization and Working Range

The working range of a glass plays an important role in the practical ability to fiberize the glass. Glasses with poor working ranges are difficult to fiberize because they have a strong tendency to crystallize in the melting and fiberization process. For softening point controlled glasses, which do not crystallize when exposed to fire, the working range is relatively good. A drawback is that in order to achieve fire resistance the softening point must be increased, which can increase the necessary fiberization temperatures too high for conventional fiberization processes.

As a general rule, glasses with a stronger tendency to crystallize have better fire resistance but are more difficult to fiberize. A challenge in developing fire resistant glasses is balancing sufficient working range against rapid crystallization during exposure to fire. Commercially available fire resistant wool glasses are often fiberized by external centrifuging because the process is tolerant of glasses with poor working ranges. Hot glass streams are fed directly to multiple rotating drums and the resulting discontinuous fiber typically contains shot particles. The overall fiber quality is generally poor in comparison to fiber created by rotary fiberization or flame attenuation. Due to the high liquidus temperature and high critical cooling rates for glass formation, glasses with a stronger tendency to crystallize are not suitable for rotary fiberization, flame attenuation, or continuous filament drawing. In particular, flame attenuation is not an option because of the difficulty in continuous primary fiber formation, and rotary fiberization is not an option because current disc metallurgy does not allow processing at temperatures necessary to keep glasses with a stronger tendency to crystallize from crystallizing. One of the biggest processing challenges of glasses with a stronger tendency to crystallize is the relatively low viscosity at the liquidus temperature. In order to maintain high enough temperature to avoid crystallization, the glass must be kept at a viscosity too low for flame attenuation or rotary fiberization. For successful fiberization of fire resistant wool glasses by rotary fiberization, flame attenuation, or continuous filament drawing, the working range must be improved over traditional rock or mineral wools.

The two measures of working range used herein are melt viscosity at the liquidus temperature and ability to pull a stable continuous filament fiber from a single-orifice bushing. The viscosity at the liquidus temperature ($\eta_{ulc}$) is a good measure of the working range because glassmaking processes often must operate at temperatures above the liquidus temperature. A glass with a low value of $\eta_{ulc}$ has a poor working range because the viscosity must be kept at values too low for practical fiberization. For reference, glasses with working ranges as low as log($\eta_{ulc}$)=2.7 (corresponding to a viscosity at liquidus temperature of greater than or equal to 500 poise) have been shown to pull stable primaries for flame attenuation and shown to be fiberizable into continuous filament fiber. Glasses with working ranges of log($\eta_{ulc}$)<2.5 (corresponding to a viscosity at liquidus temperature of less than or equal to 316 poise) have little chance of fiberizability with any process other than external centrifuge. Glasses with working ranges of log($\eta_{ulc}$)>3.0 (corresponding to a viscosity at liquidus temperature of greater than or equal to 1,000 poise) are more desirable from a practical melting and fiberization standpoint. As an additional check of the working range and fiberization ability of a particular glass composition, a single-orifice bushing is used to attempt to pull a stable continuous filament fiber. Good agreement was observed between the viscosity at liquidus and the ability to pull stable continuous filament fibers.

Without wishing to be bound by any theory, it is believed that significant amounts of iron, such as found in basalt, are important in order to enable the balance of both working range and rapid crystallization for fire resistance.

Biosolubility

An additional component of importance is the biosolubility of the fire resistant glass fibers. Fibers possessing higher dissolution rates in simulated lung fluid at pH 7.4 or simulated macrophage fluid at pH 4.6 are generally cleared from rat lungs at higher rates than glass fibers with low dissolution rates. The common measure of biodissolution rate is the dissolution rate constant $k_{dis}$ with units of ng/cm$^2$/hr. The values for glass fibers typically vary from the poor biosolubility of glass such as, for example, E-glass and basalt having a dissolution rate constant $k_{dis}$=about 2-10 ng/cm$^2$/hr, to biosoluble soft wool insulation glass having a dissolution rate constant $k_{dis}$ value in the hundreds of ng/cm$^2$/hr. Values of $k_{dis}$ much higher than basalt are desirable and values of $k_{dis}$ greater than 50 ng/cm$^2$/hr, for example, greater than 100 ng/cm$^2$/hr, are more desirable.

EXAMPLES

The following illustrative examples are intended to be non-limiting.

The glass compositions and fibers studied were prepared from common glass ingredients such as, for example, sand, soda ash, lime, iron oxide, and others. The test glasses were melted in platinum-rhodium crucibles at about 2700-2800° F. Continuous filaments were attenuated by drawing from a single-orifice platinum-rhodium bushing.

Fire Resistance Testing

The fire resistance test method involved preparing a fiber hand-sheet. Continuous filament fiber was produced with a single tip bushing and wound on a hub. The target fiber diameter was 16 μm, but for some of the glasses with poor working ranges it was not possible to control fiber diameter. The fiber was removed from the hub and chopped into ⅛" lengths. A 1.5 g sample of the chopped fiber was dispersed in greater than 1 liter of water. The dispersion was accomplished by shaking and stirring the water vigorously. Some of the glasses dispersed readily, while others required substantial effort to disperse. The fiber dispersed in water was then poured into a clear plastic pipe with an inside diameter of 4". The pipe was mounted vertically on a sealed base plate and there was an outlet valve on the side of the pipe just above the base. A round piece of screen spanning the inside diameter of the pipe was located above the outlet. The valve was closed and water filled the pipe up to the level of the screen before the dispersed fiber/water was added to the pipe. Once the dispersed fiber was added, the valve was opened and the water was slowly released. As the water flowed through the screen, the fibers collected, forming a circular mat of wet fiber on the screen. The web fiber mat was removed form the screen and the remaining water was allowed to drain. The mat was then placed on aluminum foil for several hours until completely dry. In most cases, the fiber bonded together well enough to be handled with care without damaging the mat. The area density of dried mat was approximately 190 g/m² and the thickness varied from 4-6 mm for most samples.

To test for fire resistance, the hand-sheets were mounted vertically in a metal frame, held upright by clamps on either side. A laboratory natural gas burner was lit and flame height was adjusted to 28 mm above the top of the burner. The burner was moved on a track until it was centered under the hand-sheet. The distance from the top of the burner to the bottom of the hand-sheet was fixed at 20 mm. A video camera was used to record the fire resistance test, in order to capture the time-dependence of the hand-sheet performance when exposed to the flame. Using images captured from video, the melted area of the hand-sheet was calculated at various times, with time=0 corresponding to the placement of the burner and flame under the hand-sheet. At 60 seconds of exposure, the majority of the melting had occurred, and very little additional melting took place after 60 seconds. The fire resistance tests were done in triplicate, with good agreement among the triplicate samples, and the recorded area melted was an average of the three trials.

Biosolubility

Biosolubility was estimated from glass composition based on the publicly available Owens-Corning biosolubility predictor model, which takes into account both the high and low pH mechanisms for dissolution. The predictor model is an empirical model based on many years of in-vitro biodissolution data for a wide range of glass compositions. The model has been published in the peer reviewed journal Inhalation Toxicology (Estimating In-Vitro Glass Fiber Dissolution Rate from Composition, W. Eastes, R. Potter, and J. Hadley, *Inhalation Toxicology*, Vol. 12, p. 269, 2000; Estimating Rock and Slag Wool Fiber Dissolution Rate from Composition, W. Eastes, R. Potter, and J. Hadley, *Inhalation Toxicology*, Vol. 12, p. 1127, 2000).

Table 1 shows the compositions and properties of comparative examples that were melted and characterized, while Table 2 shows the composition and properties of an exemplary glass composition as described herein that was melted and characterized. As used herein, "$R_2O$" represents alkali metal oxides (e.g., $Li_2O$, $Na_2O$, and $K_2O$) and "RO" represents alkaline earth metals oxides (e.g., MgO and CaO).

TABLE 1

|  | Comp. Ex. A | Comp. Ex. B | Comp. Ex. C | Comp. Ex. D | Comp. Ex. E | Comp. Ex. F |
|---|---|---|---|---|---|---|
| $SiO_2$ (wt %) | 50.6 | 65.2 | 54.9 | 41.0 | 38.8 | 42.7 |
| $Al_2O_3$ (wt %) | 14.0 | 3.0 | 13.6 | 14.6 | 23.2 | 23.7 |
| $Fe_2O_3$ (wt %) | 14.2 | 0.05 | 0.2 | 3.1 | 8.9 | 5.7 |
| $B_2O_3$ (wt %) | 0.0 | 5.2 | 5.5 | 0.0 | 0.0 | 0.0 |
| $TiO_2$ (wt %) | 2.8 | 0.04 | 0.5 | 0.4 | 0.5 | 0.6 |
| $Na_2O$ (wt %) | 2.4 | 16.3 | 1.3 | 1.5 | 4.3 | 5.3 |
| $K_2O$ (wt %) | 0.8 | 0.7 | 0.1 | 0.3 | 4.2 | 5.2 |

TABLE 1-continued

|  | Comp. Ex. A | Comp. Ex. B | Comp. Ex. C | Comp. Ex. D | Comp. Ex. E | Comp. Ex. F |
|---|---|---|---|---|---|---|
| $R_2O$ (wt %) | 3.2 | 17.0 | 1.4 | 1.8 | 8.5 | 10.5 |
| CaO (wt %) | 9.2 | 6.0 | 21.4 | 24.7 | 15.5 | 13.4 |
| MgO (wt %) | 5.9 | 2.8 | 2.3 | 14.5 | 4.4 | 2.6 |
| RO (wt %) | 15.1 | 8.8 | 23.7 | 39.2 | 19.9 | 16.0 |
| $T_{\eta=200\ poise}$ (° F.) | 2374 | 2187 | 2366 | 2307 | 2276 | 2453 |
| Liquidus (° F.) | 2314 | 1579 | 1994 | 2429 | 2156 | 2181 |
| Viscosity @ Liquidus (log $\eta_{ulc}$) | 2.7 | 4.4 | 4.12 | 1.29 | 2.82 | 3.19 |
| Fire Resistance Test, % "Area Melted", Relative to JM253 | 2.3 | 100.0 | 55.7 | 33.6 | 4.4 | 23.5 |
| Fire resistance Test, "Area Melted" (cm²) | 0.39 | 16.64 | 9.27 | 5.58 | 0.73 | 3.91 |
| Estimated Biodissolution Rate (ng/cm²/hr) | 2 | 97 | 10 | >800 | 303 | 106 |

TABLE 2

|  | Example 1 |
|---|---|
| $SiO_2$ (wt %) | 39.1 |
| $Al_2O_3$ (wt %) | 23.4 |
| $Fe_2O_3$ (wt %) | 8.6 |
| $B_2O_3$ (wt %) | 0.0 |
| $TiO_2$ (wt %) | 0.5 |
| $Na_2O$ (wt %) | 4.8 |
| $K_2O$ (wt %) | 4.2 |
| $R_2O$ (wt %) | 9.0 |
| CaO (wt %) | 17.7 |
| MgO (wt %) | 1.6 |
| RO (wt %) | 19.3 |
| $T_{\eta=200\ poise}$ (° F.) | 2383 |
| Liquidus (° F.) | 2203 |
| Viscosity @ Liquidus (log $\eta_{ulc}$) | 3.35 |
| Fire Resistance Test, % "Area Melted", Relative to JM253 | 5.4 |
| Fire resistance Test, "Area Melted" (cm²) | 0.89 |
| Estimated Biodissolution Rate (ng/cm²/hr) | 238 |

Comparative Example A is a basalt used for wool glass production; Comparative Example B is commercially available JM253 soft wool glass manufactured by Johns Manville Corporation; Comparative Example C is an E-glass; Comparative Example D is commercially available mineral wool manufactured by Industrial Insulation Group; Comparative Example E is disclosed in U.S. Pat. No. 6,949,483; Comparative Example F, which is commercially available ULTIMATE manufactured by Saint-Gobain Isover, is disclosed in U.S. Pat. No. 6,897,173.

Table 3 provides a generalized description of the glass compositions described herein.

TABLE 3

| Glass Oxide | Weight % |
|---|---|
| $SiO_2$ | about 33-47 |
| $Al_2O_3$ | about 18-28 |
| $Fe_2O_3$ | about 5-15 |
| $R_2O$ | $\geq$ about 2 and <10 |
| CaO | about 8-30 |
| MgO | <4 |

The glass fiber composition described in Table 3 may include about 2-10 weight % $Na_2O$. The glass fiber composition described in Table 3 may include less than or equal to about 8 weight % $K_2O$. The glass fiber composition described in Table 3 may include about 8-30 weight % RO. The glass fiber composition described in Table 3 may further include less than or equal to about 3 weight % $TiO_2$. In an embodiment, the glass fiber composition includes less than 2 weight % MgO.

For practical fiberization, the liquidus temperature should be maintained below 2350° F., for example, below 2250° F., to avoid crystallization in the process. Accordingly, Comparative Example A and Comparative Example D are not workable. Also for practically fiberization, the viscosity at the liquidus temperature should be maintained above 500 poise ($\log(\eta_{ulc})$>2.7), for example, above 1,000 poise ($\log(\eta_{ulc})$>3). Accordingly, Comparative Example A, Comparative Example D, and Comparative Example E are not workable. For sufficient fire resistance, the area melted from the fire resistance testing should be less than 15%, for example, less than 10%, relative to JM253. For the fire resistance testing described above, this corresponds to an area melted of less than 2.4 $cm^2$, for example, less than 1.6 $cm^2$. Accordingly, Comparative Example B, Comparative Example C, Comparative Example D, and Comparative Example F are not workable. The biodissolution rate should be greater than 50 ng/$cm^2$/hr, for example, greater than 100 ng/$cm^2$/hr. Accordingly, Comparative Example A and Comparative Example C are not workable. Thus, Example 1 exhibits a desirable balance of properties for use as a fire resistant fiber capable of being manufactured by rotary fiberization, flame attenuation, or by continuous filament drawing.

In particular, the desirable balance of properties includes good working ranges (e.g., liquidus temperature and viscosity at the liquidus temperature) for ease of fiberization of the glass fiber composition. The desirable balance of properties further includes characteristics of fibers formed from the glass compositions, such as, for example, good fire resistance (e.g., measure by the area melted from the fire resistance testing) and relatively high biodissolution rates, the fibers thus not posing a health risk.

The combination of desired properties allows for practical fiberization of high quality wool and continuous filament fibers that are fire resistant and biosoluble. In addition to forming continuous filament fibers, glass was also formed into high quality wool fiber of fine diameters (<1 µm) and long lengths. This fine wool fiber exhibited good thermal and acoustic insulation properties in addition to fire resistance.

The glass fiber compositions disclosed herein may include additional constituents not specified. However, additional constituents preferably do not cause a material change in the basic and novel characteristics of the composition, which include good working range, or of fibers formed therefrom, which include fire resistance and high biodissolution rate. For example, high alkali levels, of individual components or in aggregate, sometimes can result in poor fire resistance.

While various embodiments have been described, it is to be understood that variations and modifications can be resorted to as will be apparent to those skilled in the art. Such variations and modifications are to be considered within the purview and scope of the claims appended hereto.

The invention claimed is:

1. A glass fiber composition comprising:
   about 33-47 weight % $SiO_2$;
   about 18-28 weight % $Al_2O_3$;
   about 5-15 weight % $Fe_2O_3$;
   greater than or equal to about 2 weight % and less than 10 weight % $R_2O$;
   about 8-30 weight % CaO; and
   less than 2 weight % MgO;
   wherein $R_2O$ represents alkali mental oxides, and wherein the glass fiber composition has a liquidus temperature of less than 2250° F.; and a viscosity at a liquidus temperature of the glass fiber composition of greater than 1,000 poise; and glass fiber formed from the glass fiber composition has a biodissolution rate of greater than 100 ng/$cm^2$/hr.

2. The glass fiber composition of claim 1, comprising less than or equal to about 8 weight % $K_2O$.

3. The glass fiber composition of claim 1, comprising about 8-30 weight % RO, wherein RO represents alkaline earth metal oxides.

4. The glass fiber composition of claim 1, further comprising less than or equal to about 3 weight % $TiO_2$.

5. Glass fiber formed from the glass fiber composition of claim 1.

6. The glass fiber of claim 5, wherein the glass fiber exhibits a fire resistance of less than 10% area melted relative to JM253.

7. The glass fiber of claim 5, wherein the glass fiber exhibits a fire resistance of less than 10% area malted relative to JM253.

8. A method of manufacturing glass fiber from the glass fiber composition of claim 1, wherein the glass fiber is manufactured by a process selected from the group consisting of rotary fiberization, flame attenuation, or continuous filament drawing.

9. A glass fiber composition consisting essentially of:
   about 33-47 weight % $SiO_2$;
   about 18-28 weight % $Al_2O_3$;
   about 5-15 weight % $Fe_2O_3$;
   greater than or equal to about 2 weight % and less than 10 weight % $R_2O$;
   about 8-30 weight % CaO; and
   less than 2 weight % MgO;
   wherein $R_2O$ represents alkali metal oxides, and wherein the glass fiber composition has a liquidus temperature of less than 2250° F.; a viscosity at a liquidus temperature of the glass fiber composition of greater that 1,000 poise; and glass fiber formed from the glass fiber composition has a biodissolution rate of greater than 100 ng/$cm^2$/hr.

10. Glass fiber formed from the glass fiber composition of claim 9.

* * * * *